Sept. 17, 1968    H. B. ABRAMS    3,402,339
BATTERY CHARGER SYSTEM
Filed April 15, 1966
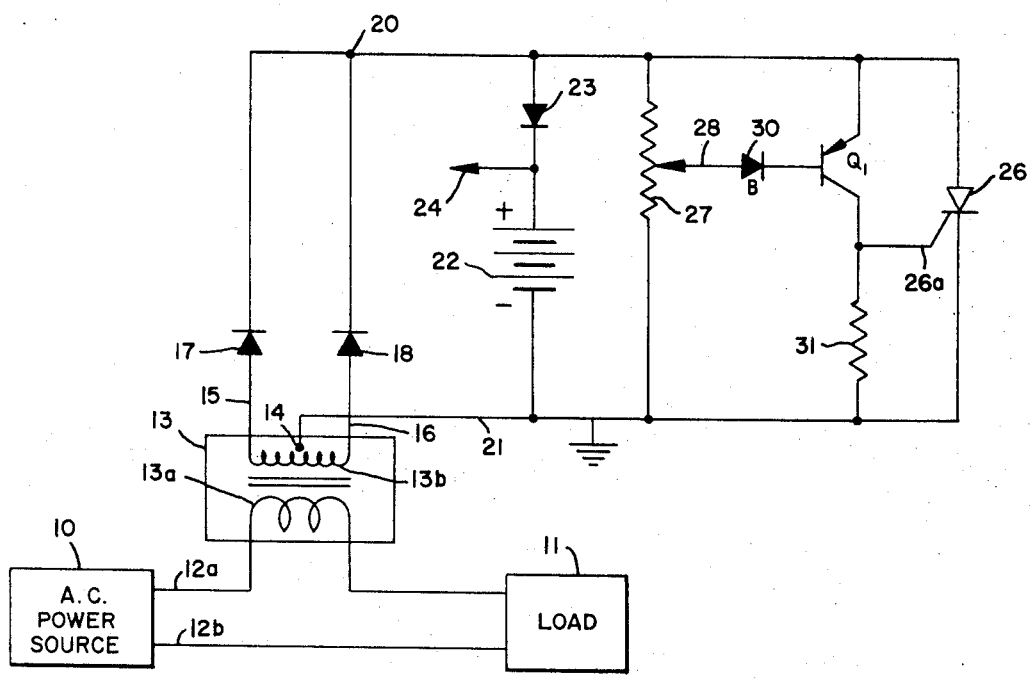
FIG_1
FIG_2A 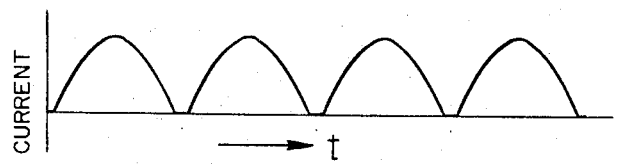
FIG_2B 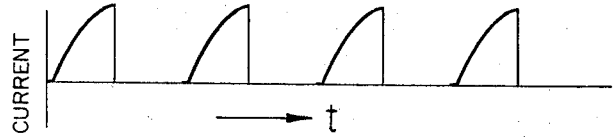
FIG_2C 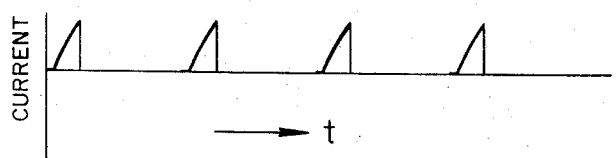
*INVENTOR.*
HERMAN B. ABRAMS
BY
ATTORNEYS

United States Patent Office 3,402,339
Patented Sept. 17, 1968

3,402,339
BATTERY CHARGER SYSTEM
Herman Benedict Abrams, 9843 E. Olive St.,
Temple City, Calif. 91780
Filed Apr. 15, 1966, Ser. No. 542,907
1 Claim. (Cl. 320—40)

ABSTRACT OF THE DISCLOSURE

A battery charger system for a highway truck inwhich the primary winding of a current transformer is coupled between an AC power source and a load which may be a refrigeration unit on the truck. The secondary winding of the transformer is coupled to a full-wave rectifier across which is connected the battery to be charged in series with a diode. The diode is so connected to conduct only charging currents. Because of the current transformer the maximum amount of charging current is determined by the load. A potentiometer across the battery and diode senses when the combined battery voltage and voltage drop across the diode during charging reaches a predetermined amount whereupon a breakdown diode on the potentiometer is closed to fire an SCR which shorts the secondary of the current transformer. Thus, during non-charging conditions the current transformer is shorted to prevent buildup of high voltages.

---

The present invention is directed to a battery charging system and more particularly to a system which is easily coupled into an existing electric generator-load combination.

Storage batteries are normally used as intermittent or emergency power supplies. Thus, to maintain or place the battery in a fully charged condition after its use, a battery charging system is provided. Such systems, of course, must derive their charging energy from a power source other than the battery. In situations where the battery is used in conjunction with portable electric generation systems (for example, the refrigeration system on a refrigerated truck or railroad car, in which a gas engine drives an electric generator which supplies electrical power to refrigeration compressors and fans), it is important that the battery charging system affect the electric generator-load combination as little as possible. Possible deleterious effects are an excessive voltage drop, current load, or unbalance in the case of apolyphase electric generator where the battery charger system utilizes only one phase.

It is a general object of the invention to provide an improved battery charger system.

It is yet another object of the present invention to provide a battery charger which does not deleteriously affect the associated electric generator-load combination.

It is stil another object of the invention to provide a battery charging system which is series connected between the associated load and electric generator.

It is yet another object of the invention to provide an improved battery charger system which may be easily coupled to an existing electric generator-load combination.

It is another object of the invention to provide a system that is relatively insensitive to the voltage output of the electric generator.

It is another object of the invention to provide a battery charging system in which the battery does not receive heavy blocks of current.

In accordance with the above objects, there is provided a battery charger system which includes a current transformer having secondary and primary windings with the primary winding being series connected between an alternating current power source and a load which is coupled to such source. A full wave rectifier is coupled to the secondary winding to provide a unidirectional output voltage between two conductors, and a battery and series connected rectifier shunt these conductors. The rectifier is connected to the battery in such a direction as to conduct only charging currents and to thereby prevent any discharge of the battery to the charging system itself. Further means are connected across the battery and rectifier series combination for selectively providing a low impedance bypass across the two when the battery is charged to a predetermined value. Lastly, there are provided means for monitoring the battery voltage and responsive to the battery voltage reaching its predetermined value to place the bypass means in its low impedance condition.

Additional objects and features of the invention will appear from the following description in which the preferred embodiment is set forth in detail in conjunction with the accompanying drawing.

Referring to the drawing:

FIGURE 1 is a circuit schematic of a battery charging system embodying the present invention; and FIGURES 2A, 2B, and 2C show various waveforms important in understanding the invention.

In FIGURE 1, there is illustrated an AC power source 10 which is coupled to a load 11 by a pair of conductors 12a and 12b. Power source 10 would most commonly be a portable electric generator capable of being carried on a highway truck which has as a prime mover either a diesel or gasoline engine. Load 11 would be, for example, the refrigeration unit on the truck.

Series connected in conductor 12a between load 11 and AC power source 10 is the primary winding 13a of a current transformer 13. The trnasformer also includes a secondary winding 13b which has a center tap terminal 14 and two output conductors 15 and 16.

In current transformer 13 the primary current flowing through primary winding 13a is determined substantially by the load 11 since the voltage drop across the transformer is relatively small compared to that across the load. Moreover, during non-charge conditions the secondary winding 13b is short circuited, as will be discussed below, to provide minimum disturbance to the load circuit. The turns ratio of transformer 13 may be adjusted for different AC supply voltages; for example, where a 120–200 volt source is used a 15 volt drop may be tolerated and therefore a turns ratio of 1 to 1 is used. For lower voltage drops higher ratios are used as indicated in FIGURE 1.

A full wave rectifier circuit is coupled to secondary winding 13b and its associated conductors 15, 16 and center tap 14. The circuit includes rectifiers 17 and 18 with their anodes coupled to conductors 15 and 16, respectively, and their cathodes tied together at a point 20. A common line 21 is connected to center tap 14 and serves as a ground with reference to point 20.

A battery 22 and a series connected diode 23 are connected across point 20 and common line 21. Diode 23 has its cathode connected to the plus voltage terminal of the battery 22 in order to prevent discharge of the battery through the charging system and to allow charging current into the battery. A lead 24 extends from the plus terminal of the battery to the load of the battery which may be, for example, the starting motor of a diesel engine.

A low impedance bypass is provided by a silicon controlled rectifier (SCR) 26 across the battery rectifier combination 22, 23 and also between common point 20 and ground 21. When a voltage is applied to gate 26a of the SCR, it fires and provides a low impedance path between point 20 and ground 21, bypassing the battery rectifier combination 22, 23 to maintain a low impedance condition across secondary 13b during the non-charging conditions of the battery. This is, of course, necessary with a current transformer since a high impedance secondary circuit will increase flux causing excessive core loss and heating and a high voltage across the secondary terminals.

Silicon controlled rectifier 26 by means of its gate 26a is actuated by means for monitoring the voltage across battery 22, the monitoring means firing the SCR when the battery voltage reaches a predetermined value. The monitoring circuit includes a potentiometer with a resistor 27 connected across the battery rectifier combination 22, 23 between point 20 and ground 21, and a sliding contactor 28 which is coupled to the base of a transistor $Q_1$ through a series connected breakdown or Zener-type diode 30. The emitter terminal of transistor $Q_1$ is coupled to point 20 and the collector to ground 21 through a resistor 31. Gate 26a is also connected to the collector of transistor $Q_1$.

OPERATION

Generally, the sliding contactor 28 determines to what value the battery will be charged which will, of course, be equal to or below the maximum theoretical charge value. When the battery 22 is in its normal state of being fully charged, the Zener diode 30 will be fired placing a voltage on the base of transistor $Q_1$ sufficient to place it in a conducting condition which, in turn, conducts heavily into the gate 26a of rectifier 26 to fire it. This produces a low impedance bypass around battery 22 and the necessary low impedance condition for secondary 13b of current transformer 13. At the same time, this very low impedance condition is transformed to primary 13 so that the electric generator-load combination 10, 11 is unaffected.

When battery 22 falls below its predetermined value, this is sensed by potentiometer 27, 28 and the reference diode 30 shuts off to in turn place transistor $Q_1$ in a nonconductive state. The firing current to gate 26a is reduced thereby placing silicon control rectifier 26 in a high impedance condition and allowing battery 22 to be charged through diode 23.

The operation of the battery charger system of the present invention is more fully explained by the current wave forms illustrated in FIGURES 2A, 2B, and 2C which show the current through battery 22 during different charging conditions of the battery. In FIGURE 2A, when the voltage across the battery 22 is significantly below its fully charged value, the silicon controlled rectifier will be open circuited continuously thus allowing the full voltage between point 20 and ground 21 to provide an almost continuous charging current through battery 22. The zero current portions of the current waveform are caused by the fact that current does not flow into the battery until the charging voltage exceeds the small voltage drop across diode 23. FIGURE 2B illustrates a partially charged condition where during the first part of a cycle the battery is charged but then reaches the predetermined value as decided by the monitoring system 27, 28, 30 to fire SCR 26. Since it has a thyratron-like characteristic, the SCR conducts during the remainder of the cycle. FIGURE 2C is similar in concept to FIGURE 2B but illustrates the fully charged condition of the battery in which a trickle charging current flows through battery 22 only a short part of a cycle before the SCR is fired.

Thus, the present invention provides an improved battery charging system in which the electric generator-load circuit is little affected by the action of the battery charger and by means of the series type of connection provides an easy, simple installation as applied to existing systems. Lastly, the battery does not receive heavy blocks of current since charging current is limited by the current through load 11.

I claim:
1. A battery charger system comprising:
a current transformer having a secondary winding and a primary winding with said primary winding being series connected between an alternating current power source and a load coupled to such source;
rectifier means coupled to said secondary winding to provide a unidirectional output voltage between two conductors;
a battery and series connected rectifier shunting said conductors, such rectifier being connected to said battery in such a direction as to conduct only charging currents;
means connected across said battery and rectifier for selectively providing a low impedance bypass when said battery is charged to a predetermined value; and
means for monitoring the battery voltage and responsive to such voltage reaching said predetermined value to place said bypass means in said low impedance bypass condition;
said monitoring means include a potentiometer connected across said conductors, a breakdown diode coupled to the output of said potentiometer, and a transistor having a base terminal coupled to said breakdown diode and another terminal to said bypass means, the reaching of said predetermined value of battery voltage being sensed by said potentiometer to fire said breakdown diode to place said transistor in a conductive state which in turn places said bypass means in said low impedance bypass condition.

References Cited

UNITED STATES PATENTS

| 3,116,439 | 12/1963 | Riebs | 320—39 X |
| 3,260,917 | 7/1966 | Shimwell et al. | 321—18 |
| 3,278,823 | 10/1966 | Ross | 320—39 X |
| 3,310,724 | 3/1967 | Grafham | 320—39 |
| 3,341,763 | 9/1967 | Noddin | 320—39 |

LEE T. HIX, *Primary Examiner.*

S. M. WEINBERG, *Assistant Examiner.*